United States Patent
Tseng et al.

(10) Patent No.: US 10,094,674 B2
(45) Date of Patent: Oct. 9, 2018

(54) PREDICTIVE VEHICLE TASK SCHEDULING

(71) Applicant: Ford Global Technologies, LLC, Dearborn, MI (US)

(72) Inventors: Fling Finn Tseng, Ann Arbor, MI (US); Anthony Mario D'Amato, Canton, MI (US); John Ottavio Michelini, Sterling Heights, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 15/044,206

(22) Filed: Feb. 16, 2016

(65) Prior Publication Data
US 2017/0234687 A1    Aug. 17, 2017

(51) Int. Cl.
| G06F 7/00 | (2006.01) |
| G06F 17/00 | (2006.01) |
| G06F 19/00 | (2018.01) |
| G01C 21/34 | (2006.01) |
| G01C 21/36 | (2006.01) |
| G07C 5/00 | (2006.01) |

(52) U.S. Cl.
CPC ......... *G01C 21/34* (2013.01); *G01C 21/3484* (2013.01); *G01C 21/3617* (2013.01); *G07C 5/008* (2013.01)

(58) Field of Classification Search
CPC . G01C 21/3484; G01C 21/3617; G07C 5/008
USPC .......................................................... 701/461
See application file for complete search history.

(56) References Cited

U.S. PATENT DOCUMENTS

| 5,919,246 | A | 7/1999 | Waizmann et al. |
| 8,024,112 | B2 | 9/2011 | Krumm et al. |
| 8,498,809 | B2 | 7/2013 | Bill |
| 9,020,743 | B2 | 4/2015 | Filev et al. |
| 9,081,651 | B2 | 7/2015 | Filev et al. |
| 2007/0150174 | A1 | 6/2007 | Seymour et al. |
| 2015/0134244 | A1 | 5/2015 | Hershey et al. |
| 2015/0169311 | A1* | 6/2015 | Dickerson ............ G06F 8/65 717/170 |

* cited by examiner

*Primary Examiner* — Maceeh Anwari
(74) *Attorney, Agent, or Firm* — Frank A. MacKenzie; Bejin Bieneman PLC

(57) ABSTRACT

A vehicle system includes a processor having a memory. The processor is programmed to predict a vehicle key-on time based on a next destination of a vehicle. The processor is further programmed to request, at a predetermined amount of time before the key-on time, optimization data from a remote server.

20 Claims, 4 Drawing Sheets

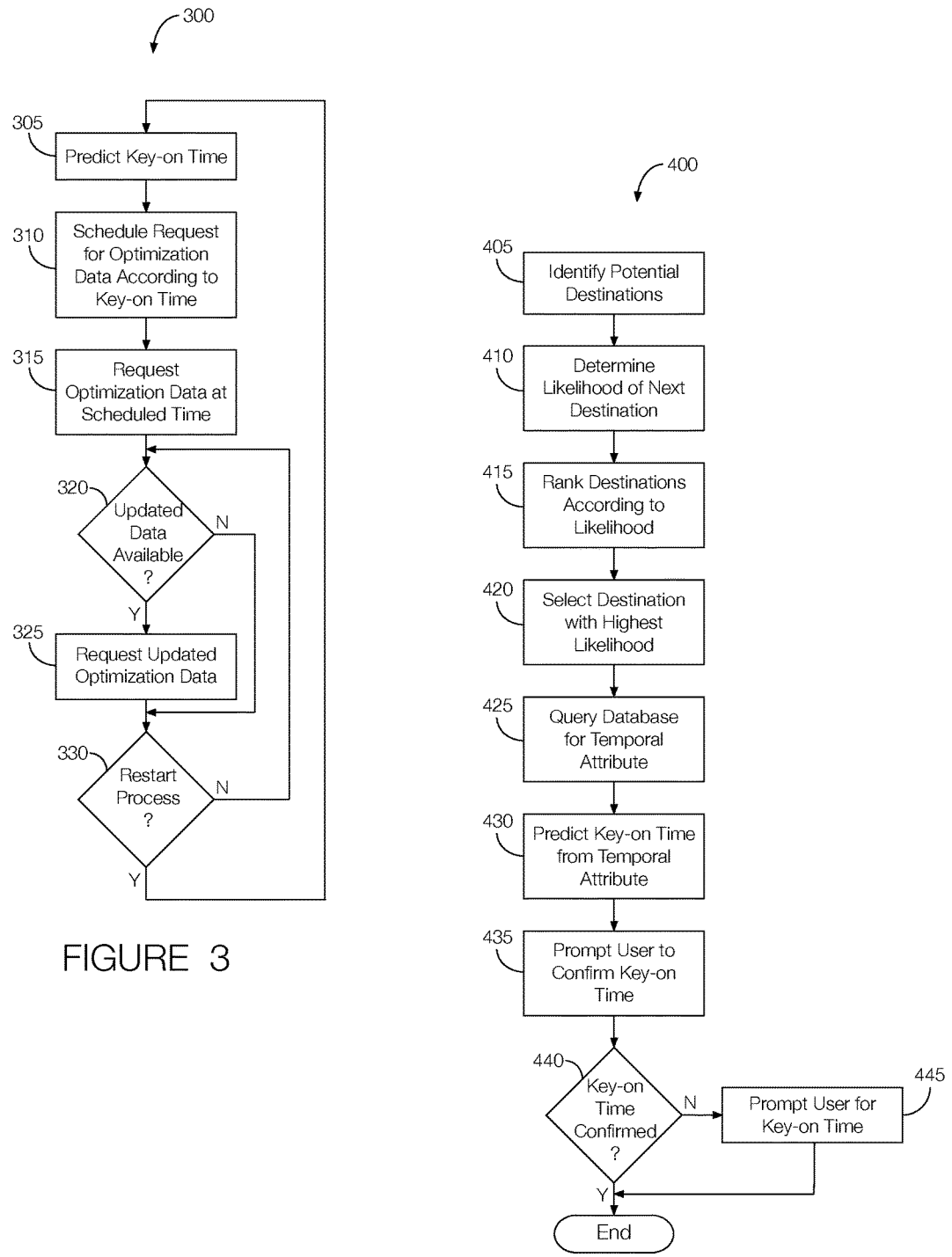

Next Destination Probability: At Home at 6:30AM

|  | Weekday | Weekend |
| --- | --- | --- |
| Home | — | — |
| Work | High | Low |
| Grocery Store | None | Low |
| Gym | Moderate | Moderate |

Next Destination Probability: At Work at 5PM

|  | Weekday | Weekend |
| --- | --- | --- |
| Home | Low | Moderate |
| Work | — | — |
| Grocery Store | Moderate | Low |
| Gym | Moderate | None |

PREDICTIVE VEHICLE TASK SCHEDULING

BACKGROUND

Vehicle computers are capable of executing complex functions. By doing so, vehicle computers can provide occupants with valuable data. Sometimes, the data underlying the complex functions is stored remotely. In some instances, the complex functions are performed remotely and data representing the result is transmitted to the vehicle.

BRIEF DESCRIPTION OF THE DRAWINGS

FIG. 3 is a flowchart of an example process that may be executed by the processor of the system shown in FIG. 1.

FIG. 4 is a flowchart of another example process that may be executed by the processor of the system shown in FIG. 1.

FIGS. 6A and 6B illustrate example databases of the probability of a future destination based on a present vehicle location.

DETAILED DESCRIPTION

Executing complex functions takes some amount of time and resources. Waiting for the vehicle to execute complex functions, therefore, can be frustrating to vehicle occupants. For example, it may take several minutes for a vehicle computer to develop a route to a particular destination, and and corresponding optimal vehicle speed profile, gather traffic information for the route, and present that data to the occupant. The occupant may wish to view such data immediately upon entering the vehicle.

One possible solution includes a vehicle system having a processor and a memory. The processor is programmed to predict a vehicle key-on time based on the vehicle's most likely next destination. The processor is further programmed to request, at a predetermined amount of time before the key-on time, optimization data from a remote server.

The optimization data may relate directly or indirectly to the destination, a route to one or more likely destination, or both. For instance, the optimization data may include traffic information, route planning information, cabin comfort control information, fuel economy information, battery longevity information, greenzone preferences, etc. For route planning, for instance, there may be more than one likely destination at the next key-on cycle. The routes to the likely destination may be prioritized based on the predicted probability of each possible destination being the next likely destination. By requesting and processing the optimization data prior to the predicted key-on time, the optimization data will be available immediately upon the occupant's entry into and desired use of the vehicle. Such data may be accessible, for instance, when the vehicle is powered up. Further, the optimization data may be readily available via a remote server, which may make the remote server a potentially more suitable option for information aggregation and computation.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
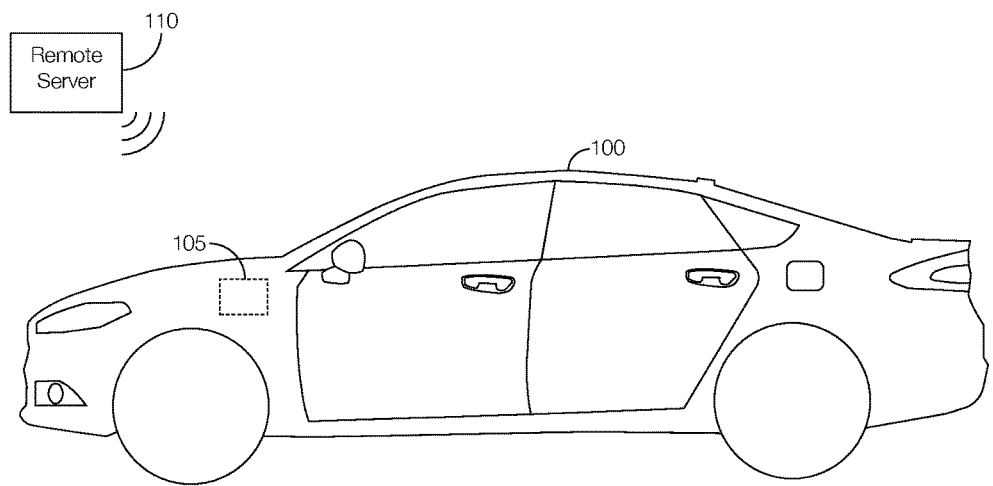
FIG. 1 illustrates an example vehicle with a system for scheduling data requests from a remote server.

As illustrated in FIG. 1, an example host vehicle 100 includes a vehicle system 105 that predicts a key-on time of the next key-on time of the host vehicle 100, predicts a route to the next destination, and requests, a predetermined amount of time before the predicted key-on time, optimization data from a remote server 110. The optimization data may include data that directly or indirectly relates to the next destination, the route, or both. For instance, the optimization data may include traffic information, route planning information, cabin comfort control information, fuel economy information, battery longevity information, greenzone preferences, etc. Predicting the key-on time may include identifying potential destinations, determining the likelihood of each of the potential destinations being the next destination, ranking the plurality of potential destinations according to the likelihood of being the next destination, and selecting the vehicle key-on time based on a temporal attribute associated with the potential destination having the highest ranking. In ranking the potential destinations, the vehicle system 105 may assign the highest ranking to the potential destination that is most likely to be the next destination.

The remote server 110 may include any number of electronic devices in wireless communication with the vehicle system 105. The remote server 110 may be programmed to receive a query from the host vehicle 100, process the query, and transmit responsive data, such as optimization data, to the host vehicle 100. For example, the query may include the likely next destination and the present location of the host vehicle 100. The remote server 110 may determine the route to the next destination from the present location of the host vehicle 100 and transmit optimization data, including the route and data associated with the route, back to the host vehicle 100. In some instances, the host vehicle 100 may develop the route via a navigation system, and the route may be transmitted from the host vehicle 100 to the remote server 110. In this possible implementation, the remote server 110 may generate the optimization data in accordance with the route provided by the host vehicle 100.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that operates in an autonomous (e.g., driverless) mode, a partially autonomous mode, and/or a non-autonomous mode.

Figure 2:
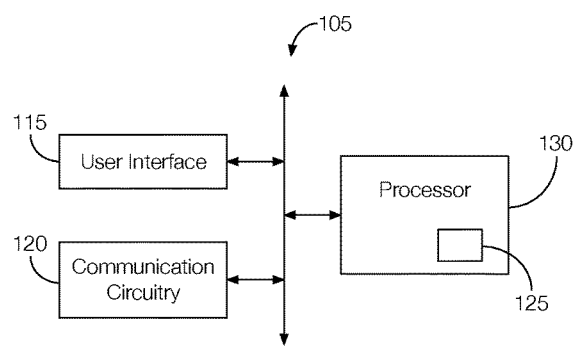
FIG. 2 is a block diagram showing components of the system of FIG. 1.

Referring now to FIG. 2, the vehicle system 105 includes a user interface 115, communication circuitry 120, a memory 125, and a processor 130.

The user interface 115 may include any number of electronic components programmed to present information to an occupant of the host vehicle 100 during operation of the host vehicle 100. Moreover, the user interface 115 may be programmed to receive user inputs. The user interface 115 may be located in, e.g., the passenger compartment of the host vehicle 100 and, in some possible approaches, may include a touch-sensitive display screen. The user interface 115 may be programmed to present prompts to a vehicle occupant in accordance with a signal received from the processor 130. For example, in response to a signal from the processor 130, the user interface 115 may prompt an occupant to confirm the next destination, the next key-on time, or both.

The communication circuitry 120 may include any number of electronic components programmed to facilitate wired or wireless communication with internal or external devices. For example, the communication circuitry may be programmed to communicate wirelessly with the remote server 110 and over a CAN bus, OBD-II, or Ethernet connection with the user interface 115, memory 125, or processor 130.

The memory 125 may include any number of electronic components that stores data. For instance, the memory 125 may be programmed to store data, such as optimization data, received from the remote server 110 or generated by the processor 130. In some possible approaches, the memory 125 may store historical data. For instance, the memory 125 may store data associated with the present and past locations of the host vehicle 100, various routes taken by the host vehicle 100, times at which the host vehicle 100 has been used, etc.

The processor 130 may include any number of electronic components programmed to predict when to request optimization data from the remote server 110 so that the optimization data can be received and processed ahead of use of the host vehicle 100. For instance, the processor 130 may access historical data stored in the memory 125 and predict the next destination, and the key-on time for the next destination, in accordance with the historical data.

To predict the key-on time, the processor 130 may be programmed to identify potential destinations. The potential destinations may be identified from a list of previous destinations to which the host vehicle 100 has traveled. The list may be stored in the memory 125. Examples of potential destinations may include an occupant's home location, an occupant's work location, a grocery store, a gym, a school, a park, or any other location where the occupant frequently or periodically travels. With the potential destinations identified, the processor 130 may be programmed to determine the likelihood of each of the potential destinations being the next destination. The likelihood may be based on the identify of the user (e.g., if multiple people use the same vehicle), the present location of the host vehicle 100, the time of day, the day of the week, and so on. For example, the processor 130 may determine, from data stored in the memory 125, that the host vehicle 100 is presently at the occupant's home location at 6:30 AM on a Monday morning. The processor 130 may know, from data stored in the memory 125, that the occupant typically leaves for work at 7 AM on Monday mornings. Therefore, based on the present location, the time of day, and the day of the week, the processor 130 may determine that the next destination is most likely going to be the occupant's work location.

In instances where multiple destinations could be the next destination, the processor 130 may be programmed to rank the potential destinations according to their likelihood of being the next destination. For example, from data stored in the memory 125, the processor 130 may determine that the occupant travels from work to the grocery store, the gym, or home. The processor 130 may rank the grocery store, gym, and home based on how likely it is that those locations will be the next destination according to the time of day and day of the week relative to the data stored in the memory 125 device. For instance, if the occupant typically goes to the gym on Monday, Wednesday, and Friday after work and typically goes to the grocery store on Tuesday after work, the processor 130 may rank the gym higher than the grocery store on Monday, Wednesday, and Friday afternoons but rank the grocery store higher than the gym on Tuesday afternoons. The processor 130 may assign the highest rank, therefore, to the potential destination that is most likely to be the next destination given the circumstances and data stored in the memory 125.

With the next destination determined according to the ranking, the processor 130 may be programmed to determine a temporal attribute associated with the next destination (i.e., the potential destination with the highest ranking). The temporal attribute may define the time at which the host vehicle 100 is likely to travel to the next destination. For example, if the next destination on a Monday morning is the occupant's work location, the temporal attribute may include the time at which the occupant typically leaves for work on Monday mornings. The processor 130 may query a database, stored in the memory 125, for the temporal attribute.

The processor 130 may be programmed to select the key-on time in accordance with the temporal attribute. That is, because the temporal attribute is associated with the time at which the host vehicle 100 will travel to the next destination, the key-on time will occur at approximately the same time as indicated by the temporal attribute if not a few seconds before.

In some possible implementations, the processor 130 may be programmed to schedule a request for optimization data to occur some predetermined amount of time before the key-on time. The length of the predetermined amount of time may be based on the time of day, day of the week, next destination, the amount of time to complete certain computational tasks, and so on. For instance, during busy times such as rush hour, the remote server 110 may field many requests for optimization data from many vehicles. Therefore, it may take the remote server 110 longer to respond. Anticipating such delays, the processor 130 may schedule the request to occur a few minutes, as opposed to a few seconds, before the key-on time. Moreover, the distance to the destination may affect the length of the predetermined amount of time. Because the optimization data may include traffic data associated with the route, a longer route may mean that the remote server 110 will need more time to generate and transmit the appropriate traffic data. Further, the predetermined amount of time may be generated to consider the amount of time the processor 130 may need to process the optimization data prior to the key-on time.

The processor 130 may be programmed to request, the scheduled predetermined amount of time before the key-on time, the optimization data from the remote server 110. Requesting the optimization data may include transmitting a query to the remote server 110. The query may include the present location of the host vehicle 100, the next destination, and possibly information about one or more vehicle subsystems such as a battery state of charge, fuel level, etc. The request may be transmitted to the remote server 110 via the communication circuitry 120, and the remote server 110 may respond to the request by transmitting optimization data to the processor 130 via the communication circuitry 120.

The processor 130 may process the optimization data prior to the key-on time. From the optimization data, the processor 130 may determine the route to the next destination, which may include compensating for any traffic issues identified by the optimization data. Traffic issues may include, e.g., traffic congestion, traffic speed and variability, construction, road closures, etc.

The processor 130 may be further programmed to anticipate certain changes or inconsistencies in the occupant's usage of the host vehicle 100. For instance, the processor 130 may execute the process to determine the next destination when the host vehicle 100 reaches its current destination and before the host vehicle 100 is turned off. Before key-off, the processor 130 may be programmed to determine the next destination and predicted key-on time, prompt the occupant, via the user interface 115, to confirm the next destination and key-on time, and receive either confirmation or modification of the next destination, the key-on time, or both, via a user input provided via the user interface 115. The processor 130 may either proceed with the predicted next destination and key-on time or with the next destination or key-on time identified via user input.

While traveling to the next destination, the processor 130 may periodically request updated optimization data from the remote server 110. The request for updated optimization data may be transmitted from the communication circuitry 120 to the remote server 110, and updated optimization data may be transmitted from the remote server 110 to the processor 130 via the communication circuitry 120. The processor 130 may apply the updated optimization data to, e.g., update the route according to new traffic data, fuel data, battery charge data, etc.

FIG. 3 is a flowchart of an example process 300 that may be executed by the vehicle system 105. The process may be executed prior to a key-on cycle or possibly while the vehicle is running (e.g., before a key-off cycle). Further, the process may be executed at predetermined times regardless of whether the host vehicle 100 is operating or not.

At block 305, the vehicle system 105 may predict the key-on time. To predict the key-on time, the processor 130 may identify potential destinations, determine the likelihood of each potential destination being the next destination, rank the destinations according to likelihood, select the destination with the highest likelihood as the next destination, query a database for the temporal attribute associated with the likely next destination, and predict the key-on time according to the temporal attribute. Additional details about predicting the key-on time are discussed below with respect to the process 400 of FIG. 4.

At block 310, the vehicle system 105 may schedule a request for optimization data. The processor 130, for instance, may schedule the request according to a predetermined amount of time before the key-on time. The length of the predetermined amount of time may be based on the time of day, day of the week, next destination, and so on. For instance, during busy times such as rush hour, the remote server 110 may field many requests for optimization data from many vehicles. Therefore, it may take the remote server 110 longer to respond. Anticipating such delays, the processor 130 may schedule the request to occur a few minutes, as opposed to a few seconds, before the key-on time. Moreover, the distance to the destination may affect the length of the predetermined amount of time. Because the optimization data may include traffic data associated with the route, a longer route may mean that the remote server 110 will need more time to generate and transmit the appropriate traffic data. Further, the predetermined amount of time may be generated to consider the amount of time the processor 130 may need to process the optimization data prior to the key-on time. Therefore, the processor 130 may account for these and possibly other factors when scheduling the request for optimization data at block 310.

At block 315, the vehicle system 105 may request optimization data at the scheduled time. For instance, the processor 130 may, at the predetermined amount of time before the key-on time, request the optimization data from the remote server 110. Requesting the optimization data may include transmitting a query to the remote server 110. The query may include the present location of the host vehicle 100, the next destination, and possibly information about one or more vehicle subsystems such as a battery state of charge, fuel level, etc. The request may be transmitted to the remote server 110 via the communication circuitry 120, and the remote server 110 may respond to the request by transmitting optimization data to the processor 130 via the communication circuitry 120.

At decision block 320, the vehicle system 105 may determine whether any updated optimization data is available. For instance, the processor 130 may periodically query the remote server 110 to determine if updated optimization data is available. Alternatively or in addition, the processor 130 may determine that updated data is available from the remote server 110 in response to a change in vehicle usage, such as an unexpected key-on, deviation from a particular route, deviation from a planned or optimal vehicle speed or mode, a change in fuel or battery charge data, etc. The process 300 may proceed to block 325 if updated optimization data is available. Otherwise, the process 300 may proceed to block 330.

At block 325, the vehicle system 105 may request updated optimization data. Upon instruction from the processor 130, the request for updated optimization data may be transmitted from the communication circuitry 120 to the remote server 110, and updated optimization data may be transmitted from the remote server 110 to the processor 130 via the communication circuitry 120. The processor 130 may apply the updated optimization data to, e.g., update the route according to new traffic data, fuel data, battery charge data, etc.

At decision block 330, the vehicle system 105 may determine whether to restart the process 300. The process 300 may be restarted when, e.g., the processor 130 determines that the host vehicle 100 is about to enter a key-off cycle. For instance, the processor 130 may detect that the host vehicle 100 is at or near the next destination and that the next request for optimization data may need to be scheduled. Therefore, the process 300 may restart by returning to block 305. Otherwise, the process 300 may continue with block 320 so that the processor 130 may determine whether updated optimization data is available.

FIG. 4 is a flowchart of an example process 400 that may be executed by the vehicle system 105 to predict the key-on time. The process 400, therefore, may be initiated in accordance with block 305 of the process 300 described above with reference to FIG. 3.

At block 405, the vehicle system 105 may identify at least one potential destination. The potential destinations may be identified by the processor 130 from a list of previous destinations to which the host vehicle 100 has traveled. The list may be stored in the memory 125. Examples of potential destinations may include an occupant's home location, an occupant's work location, a grocery store, a gym, a school, a park, or any other location where the occupant frequently or periodically travels.

At block 410, the vehicle system 105 may determine the likelihood that each of the potential destinations being the next destination. The likelihood may be based on the present location of the host vehicle 100, the time of day, the day of the week, and so on. For example, the processor 130 may determine, from data stored in the memory 125, that the host vehicle 100 is presently at the occupant's home location at 6:30 AM on a Monday morning. The processor 130 may know, from data stored in the memory 125, that the occupant typically leaves for work at 7 AM on Monday mornings. Therefore, based on the present location, the time of day, and the day of the week, the processor 130 may determine that the next destination is most likely going to be the occupant's work location.

At block 415, the vehicle system 105 may rank the destinations according to the likelihood that each is the next destination. For example, from data stored in the memory 125, the processor 130 may determine that the occupant travels from work to the grocery store, the gym, or home. The processor 130 may rank the grocery store, gym, and home based on how likely it is that those locations will be the next destination according to the time of day and day of the week relative to the data stored in the memory 125 device. For instance, if the occupant typically goes to the gym on Monday, Wednesday, and Friday after work and typically goes to the grocery store on Tuesday after work, the processor 130 may rank the gym higher than the grocery store on Monday, Wednesday, and Friday afternoons but rank the grocery store higher than the gym on Tuesday afternoons. The processor 130 may assign the highest rank, therefore, to the potential destination that is most likely to be the next destination given the circumstances and data stored in the memory 125.

At block 420, the vehicle system 105 may select the potential destination with the highest rank as the most likely next destination. The selection may be made by the processor 130 following the ranking applied at block 415.

At block 425, the vehicle system 105 may determine a temporal attribute associated with the next destination. The temporal attribute may define the time at which the host vehicle 100 is likely to travel to the next destination. For example, if the next destination on a Monday morning is the occupant's work location, the temporal attribute may include the time at which the occupant typically leaves for work on Monday mornings. The processor 130 may query a database, stored in the memory 125, for the temporal attribute.

At block 430, the vehicle system 105 may predict the key-on time from the temporal attribute. The key-on time may be predicted by the processor 130 according to the temporal attribute since the temporal attribute is associated with the time at which the host vehicle 100 will travel to the next destination. Therefore, the processor 130 may determine that the key-on time will most likely occur at approximately the same time as indicated by the temporal attribute if not a few seconds before.

At block 435, the vehicle system 105 may prompt the user to confirm the key-on time predicted at block 430. The processor 130 may command the user interface 115 to display the prompt, and the user interface 115 may receive a user input either confirming or denying the next key-on time. Another possible option is for the user to provide a user input indicating that the user does not know when the next key-on time will occur.

At decision block 440, the vehicle system 105 may determine whether the key-on time has been confirmed. For instance, the processor 130 may process the user input provided in response to the prompt at block 435 to determine whether the user has confirmed the key-on time. If confirmed, the process 400 may end, which may include proceeding to block 310 of the process 300 described above with reference to FIG. 3. If the key-on time predicted at block 430 is not confirmed by the user input provided in response to the prompt at block 435, the process 400 may proceed to block 445.

At block 445, the vehicle system 105 may prompt the user for the correct next key-on time. The processor 130 may initiate the prompt by commanding the user interface 115 to display the prompt. The user interface 115 may receive the correct next key-on time via a user input provided by the occupant. The process 400 may end after block 445. Again, ending the process 400 may include proceeding to block of the process 300 discussed above with reference to FIG. 3.

Figure 5A:
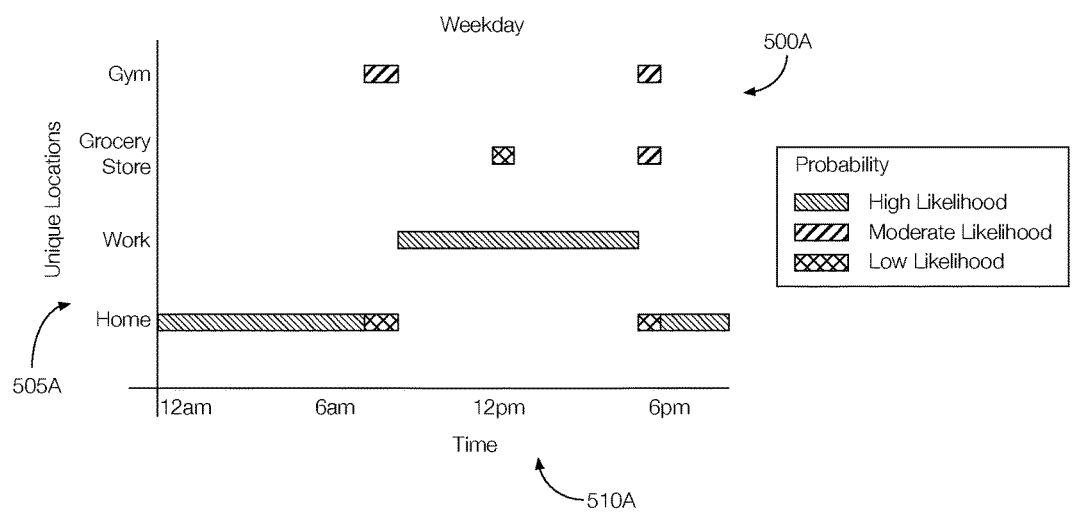
FIGS. 5A and 5B are graphs illustrating example vehicle location data and probability of future destinations.
Figure 5B:
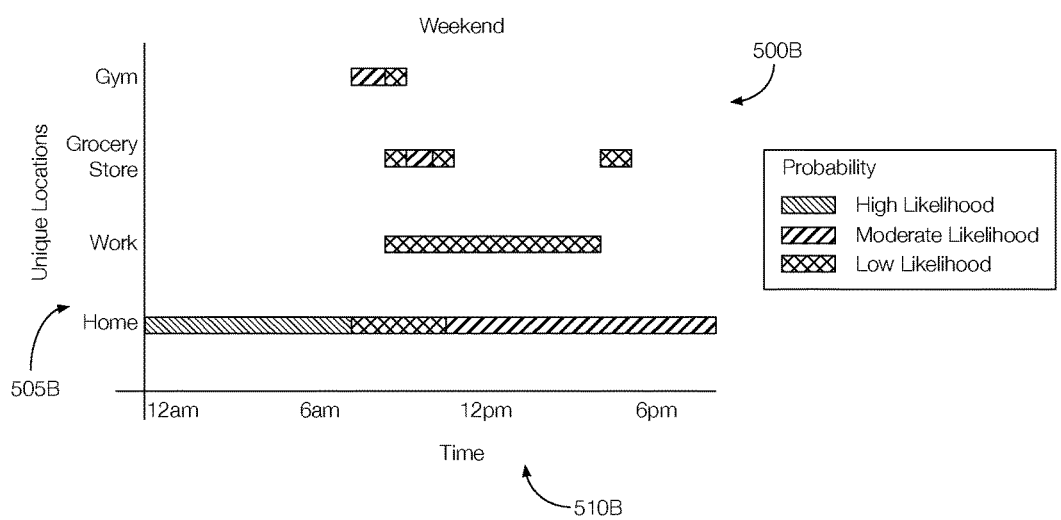

FIGS. 5A and 5B illustrate example graphs 500A and 500B that relate particular locations to various times, and the likelihood that the host vehicle 100 will be at one of those locations at the particular time. Further, many vehicle occupants have relatively consistent schedules. However, the schedule may not be the same day-to-day. For instance, the occupant may follow the same schedule during the week but have a different schedule on the weekends. Therefore, the graphs 500A and 500B represent different patterns a particular vehicle occupant may follow on weekdays and on weekends, respectively. The graphs 500A and 500B present example data that has been simplified for purposes of clarity. The vehicle system 105 may consider many more potential destinations and with many more degrees of likelihood. Further, the data may be separated according to different patterns other than "weekdays" and "weekends".

The graph 500A of FIG. 5A may represent a 24-hour period of a weekday for a particular vehicle occupant. Potential destinations 505A are shown along the y-axis and the time 510A is shown along the x-axis. The bars represent the likelihood that the host vehicle 100 is at any particular destination at any particular time.

In the simplified example of graph 500A, the host vehicle 100 is usually at the occupant's home until about 7:30 am. Therefore, the bar indicates that there is a high likelihood that the host vehicle 100 will be at the occupant's home until that time. Sometimes, but not always, the occupant drives to the gym before going to work. Therefore, there is a low likelihood that the host vehicle 100 will remain at the occupant's home until approximately 8:30 am. There is a moderate likelihood that the occupant will use the host vehicle 100 to travel to the gym until about 8:30. From the gym or home, there is a high likelihood that the occupant will use the host vehicle 100 to travel to work until about 5:30 pm. Occasionally, the occupant goes to the grocery store during the lunch hour. Therefore, the grocery store has a low likelihood of being the next destination at around noon.

After work, at about 5:30 pm, there is a moderate likelihood that the occupant will use the host vehicle 100 to travel to the gym or grocery store, especially if the occupant did not go to either earlier in the day. There is a low likelihood that the owner will go directly home from work. However, as shown in the example graph 500A, there is a high likelihood that the occupant will use the host vehicle 100 to travel home around 6 pm after going to the gym or grocery store.

Accordingly, the data shown in the graph 500A can be stored in the memory 125 and used by the processor 130 to predict when the host vehicle 100 will be used next and which destination is most likely on weekdays.

Turning now to FIG. 5B, the simplified graph 500B illustrates that the host vehicle 100 is most likely at the occupant's home until 7:30 am. Occasionally, the host vehicle 100 is driven to the gym and then to the grocery store. Because the occupant may not necessarily go to those locations at approximately the same time (e.g., within 30 minutes) every weekend, those locations are shown with a mix of probabilities. For instance, there is a moderate likelihood that the host vehicle 100 will be driven to the gym around 7:30 am and then to the grocery store. Sometimes, but not always, the occupant may spend a longer amount of time at the gym before going to the grocery store. That variation is represented by the gym and grocery store having a moderate likelihood for some period of time and a low likelihood for other periods of time. Also shown in the graph 500B, to capture the rare instance where the occupant goes to work on a weekend, the occupant's work location is shown with a low likelihood.

In the example simplified data shown in FIG. 5B, there are some weekends where the occupant spends the majority of the day at home and others where the occupant runs errands during the day. For example, as shown in the graph 500B, there is a high likelihood that the host vehicle 100 is at the occupant's home before 7:30 am and after 7:15 pm. There is a low likelihood that the host vehicle 100 is at the occupant's home from 7:30 am until 10:45 am, which may represent the period of time where the occupant most likely uses the host vehicle 100 to run errands or go to the gym. Because the occupant may continue to run errands or may not immediately return home, or if the occupant uses the vehicle to meet friends in the afternoon or evening, there is a moderate likelihood that the host vehicle 100 will be at the occupant's home location from 10:45 am until midnight.

Thus, the data shown in the graph 500B can be stored in the memory 125 and used by the processor 130 to predict when the host vehicle 100 will be used next and which destination is most likely on weekends.

FIGS. 6A and 6B illustrate example databases 600A and 600B that relate data stored in the memory 125 that can be used by the processor 130 to determine the next likely destination and associated key-on times. As with the graphs 500A and 500B, the data shown in these databases 600A and 600B has been simplified for purposes of clarity.

Referring to FIG. 6A, the database 600A may relate data that can be used by the processor 130 to determine the next likely destination if the host vehicle 100 is presently at the occupant's home at 6:30 am. As shown, on a weekday, there is a high likelihood that the next location is the occupant's work location and a moderate likelihood that the next location is the gym. In this example, the occupant has never taken the host vehicle 100 from his or her home location to the grocery store first thing on a weekday morning. Therefore, the likelihood that the grocery store is the next destination is simply "none". From this data, the processor 130 may determine that the next destination is the occupant's work location. Although not shown in this database 600A, the processor 130 may determine the key-on time and the predetermined amount of time before the key-on time for scheduling the request for optimization data associated with operating the host vehicle 100 from the occupant's home to the occupant's work location.

The database 600A further illustrates how different days may affect the likelihood of the next destination. For example, on a weekday, as discussed above, the next destination is most likely the occupant's work location. On a weekend, however, the database 600A indicates that the next destination is most likely the gym.

Similarly, referring now to FIG. 6B, the database 600B may identify the likelihood of potential destinations being the next destination when the host vehicle 100 is at the occupant's work location at 5 pm. On a weekday, the grocery store or gym are moderately likely to be the next destination. The processor 130 may plan for either of those locations to be the next destination by scheduling the request for optimization data accordingly. For instance, the processor 130 may schedule the request for optimization data according to whichever destination typically occurs first and update the schedule if the host vehicle 100 is not turned on at the predicted key-on time.

Thus, by using the historical data stored in the memory 125, the processor 130 may anticipate usage of the host vehicle 100 so that it may receive and process optimization data so that the optimization data is immediately available when the occupant begins to use the host vehicle 100.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a processor having a memory, wherein the processor is programmed to:
   predict a vehicle key-on time based on a next destination of a vehicle; and
   request, at a predetermined amount of time before the key-on time, optimization data from a remote server,
   wherein the optimization data from the remote server includes traffic information and route planning information for a route to the next destination, and
   wherein the predetermined amount of time before the key-on time is based at least in part on an amount of time to receive and process the optimization data from the remote server.

2. The vehicle system of claim 1, wherein the processor is programmed to predict the vehicle key-on time by:
   identifying a plurality of potential destinations;
   determining a likelihood of each of the plurality of potential destinations being the next destination;
   ranking the plurality of potential destinations according to the likelihood of being the next destination, including assigning a highest ranking to one of the plurality of potential destinations that is most likely to be the next destination; and
   selecting the vehicle key-on time based on a temporal attribute associated with the potential destination having the highest ranking.

3. The vehicle system of claim 2, wherein the processor is programmed to query a database for the temporal attribute associated with the potential destination having the highest ranking.

4. The vehicle system of claim 3, wherein the temporal attribute includes a time at which the vehicle is predicted to travel to the potential destination having the highest ranking.

5. The vehicle system of claim 3, wherein the processor is programmed to schedule the request for the optimization data in accordance with the temporal attribute associated with the potential destination having the highest ranking.

6. The vehicle system of claim 1, wherein the processor is programmed to request confirmation of the vehicle key-on time.

7. The vehicle system of claim 1, wherein the processor is programmed to request confirmation of the next destination.

8. The vehicle system of claim 1, wherein the processor is programmed to periodically request updated optimization data from the remote server.

9. The vehicle system of claim 1, wherein the predetermined amount of time before the vehicle key-on time is based at least in part on an amount of time associated with receiving the optimization data requested from the remote server.

10. The vehicle system of claim 1, wherein the predetermined amount of time before the vehicle key-on time is based at least in part on an amount of time associated with processing the optimization data requested from the remote server.

11. A vehicle system comprising:
    communication circuitry programmed to wirelessly communicate with a remote server; and
    a processor having a memory, wherein the processor is programmed to:
    predict a vehicle key-on time based on a next destination of a vehicle, and request, at a predetermined amount of time before the key-on time, optimization data from the remote server;

wherein the communication circuitry is programmed to transmit the request to the remote server, receive the optimization data from the remote server, and transmit the optimization data to the processor, wherein the optimization data from the remote server includes traffic information and route planning information for a route to the next destination, and wherein the predetermined amount of time before the key-on time is based at least in part on an amount of time to receive and process the optimization data from the remote server.

12. The vehicle system of claim 11, wherein the processor is programmed to predict the vehicle key-on time by:
identifying a plurality of potential destinations;
determining a likelihood of each of the plurality of potential destinations being the next destination;
ranking the plurality of potential destinations according to the likelihood of being the next destination, including assigning a highest ranking to one of the plurality of potential destinations that is most likely to be the next destination; and
selecting the vehicle key-on time based on a temporal attribute associated with the potential destination having the highest ranking.

13. The vehicle system of claim 12, wherein the processor is programmed to query a database for the temporal attribute associated with the potential destination having the highest ranking.

14. The vehicle system of claim 13, wherein the temporal attribute includes a time at which the vehicle is predicted to travel to the potential destination having the highest ranking.

15. The vehicle system of claim 13, wherein the processor is programmed to schedule the request for the optimization data in accordance with the temporal attribute associated with the potential destination having the highest ranking.

16. The vehicle system of claim 11, wherein the processor is programmed to request confirmation of the vehicle key-on time.

17. The vehicle system of claim 11, further comprising a user interface and wherein the processor is programmed to request confirmation of the next destination via the user interface.

18. The vehicle system of claim 11, wherein the processor is programmed to periodically request updated optimization data from the remote server and wherein the communication circuitry is programmed to transmit the request for updated optimization data to the remote server.

19. The vehicle system of claim 11, wherein the predetermined amount of time before the vehicle key-on time is based at least in part on an amount of time associated with receiving the optimization data requested from the remote server.

20. The vehicle system of claim 11, wherein the predetermined amount of time before the vehicle key-on time is based at least in part on an amount of time associated with processing the optimization data requested from the remote server.

* * * * *